United States Patent
Ueda et al.

(10) Patent No.: US 7,515,214 B2
(45) Date of Patent: Apr. 7, 2009

(54) LIQUID CRYSTAL DISPLAY COMPRISING A PIXEL REGION INCLUDING AREAS WITH DIFFERENT EFFECTIVE VOLTAGES

(75) Inventors: Kazuya Ueda, Kawasaki (JP); Tsuyoshi Kamada, Kawasaki (JP); Hidefumi Yoshida, Kawasaki (JP); Yoshio Koike, Kawasaki (JP); Kenji Okamoto, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 120 days.

(21) Appl. No.: 10/808,218

(22) Filed: Mar. 24, 2004

(65) Prior Publication Data

US 2005/0128371 A1 Jun. 16, 2005

(30) Foreign Application Priority Data

Mar. 31, 2003 (JP) ............................. 2003-093191

(51) Int. Cl.
 G02F 1/133 (2006.01)
 G02F 1/1335 (2006.01)
 G02F 1/1343 (2006.01)
 G02F 1/1337 (2006.01)

(52) U.S. Cl. .................. 349/33; 349/106; 349/143; 349/129

(58) Field of Classification Search ................. 349/107, 349/33
 See application file for complete search history.

(56) References Cited

U.S. PATENT DOCUMENTS 5,644,415 A * 7/1997 Aoki et al. .................. 349/122
5,790,218 A 8/1998 Koden et al.
5,936,693 A * 8/1999 Yoshida et al. .............. 349/139
6,452,654 B2 * 9/2002 Kubo et al. .................. 349/114
6,466,280 B1 * 10/2002 Park et al. ...................... 349/43
6,909,479 B2 * 6/2005 Iijima .......................... 349/109
6,977,704 B2 12/2005 Kataoka ...................... 349/130
7,113,238 B2 * 9/2006 Okumura ..................... 349/114
2001/0040546 A1 * 11/2001 Ohmuro et al. ................ 345/87
2002/0030780 A1 * 3/2002 Nishida et al. .............. 349/141
2002/0075436 A1 * 6/2002 Kubo et al. .................. 349/129
2003/0043326 A1 * 3/2003 Sawasaki et al. ............. 349/123
2003/0048401 A1 3/2003 Hanaoka et al. ............. 349/123
2003/0058374 A1 * 3/2003 Takeda et al. .................. 349/33
2003/0160750 A1 8/2003 Ueda et al. ..................... 345/87

FOREIGN PATENT DOCUMENTS

| JP | A 4-37719 | 2/1992 |
| JP | A 8-211366 | 8/1996 |
| JP | 2002-357830 | 12/2002 |
| JP | 2003-255305 | 9/2003 |

* cited by examiner

Primary Examiner—David Nelms
Assistant Examiner—W. Patty Chen
(74) Attorney, Agent, or Firm—Greer, Burns & Crain, Ltd.

(57) ABSTRACT

The invention relates to a liquid crystal display used as a display section of an electronic apparatus and provides a liquid crystal display having high chromaticity characteristics and viewing angle characteristics. A configuration is employed which includes substrates having electrodes on respective surfaces thereof opposite to each other, a liquid crystal sealed between the substrates, and a pixel region including a low effective voltage area in which an effective voltage applied to the liquid crystal is lower than a voltage applied between the electrodes, the low effective voltage area occupying part of the region in a predetermined area ratio, the pixel region having a threshold voltage that varies between the low effective voltage area and another area.

18 Claims, 10 Drawing Sheets

| EMBODIMENT | THICKNESS OF DIELECTRIC LAYER (μm) | | | CELL THICKNESS (μm) | | | TRANS-MITTANCE | GRADATION/ CHROMATICITY VARIATION | | RESULTS OF EYE OBSERVATION | |
|---|---|---|---|---|---|---|---|---|---|---|---|
| | RED | GREEN | BLUE | RED | GREEN | BLUE | | FRONTAL DIRECTION | UPWARD DIRECTION AT 60 DEG. | GRADATION/ VIEWING ANGLE CHARACTER-ISTICS | GRADATION/ CHROMA-TICITY VARIATION |
| REF. | ... | ... | ... | 3.6 | 3.6 | 3.6 | 1.00 | 0.11 | 0.13 | × | △ |
| 1-1 | 0.5 | 0.5 | 0.5 | 3.6 | 3.6 | 3.6 | 0.90 | 0.06 | 0.09 | ◎ | △ |
| 1-2 | 0.5 | 0.5 | 0.5 | 4.3 | 4.3 | 4.3 | 0.98 | 0.11 | 0.17 | ◎ | × |
| 1-3 | 0.3 | 0.5 | 0.7 | 4.3 | 4.3 | 4.3 | 0.99 | 0.05 | 0.11 | ◎ | ○ |
| 1-4 | 0.5 | 0.5 | 0.5 | 4.7 | 4.3 | 3.5 | 0.98 | 0.01 | 0.03 | ◎ | ◎ |
| 1-5 | 0.5 | 0.5 | 0.5 | 4.3 | 4.3 | 4.3 | 0.96 | 0.01 | 0.02 | ◎ | ◎ |
| 1-6 | ... | ... | ... | 3.6 | 3.6 | 3.6 | 0.93 | 0.07 | 0.10 | ○ | △ |

LIQUID CRYSTAL DISPLAY COMPRISING A PIXEL REGION INCLUDING AREAS WITH DIFFERENT EFFECTIVE VOLTAGES

BACKGROUND OF THE INVENTION

1. Field of the Invention

The present invention relates to a liquid crystal display used as a display section of an electronic apparatus and, more particularly, to an MVA mode liquid crystal display having high viewing angle characteristics.

2. Description of the Related Art

An MVA (Multi-domain Vertical Alignment) mode liquid crystal display (hereinafter referred to as "MVA-LCD") is a liquid crystal display which is a combination of vertical alignment techniques for achieving high contrast and high response and domain division (Multi-Domain) techniques for achieving a wide viewing angle. An MVA-LCD has alignment regulating structures (linear protrusions and blanks in electrodes) provided on a substrate to achieve domain division. Alignment regulating structures also have the effect of eliminating a need for a rubbing process which is a major cause of a reduction in productivity. Therefore, high productivity is achieved for MVA-LCDs.

Figure 18:
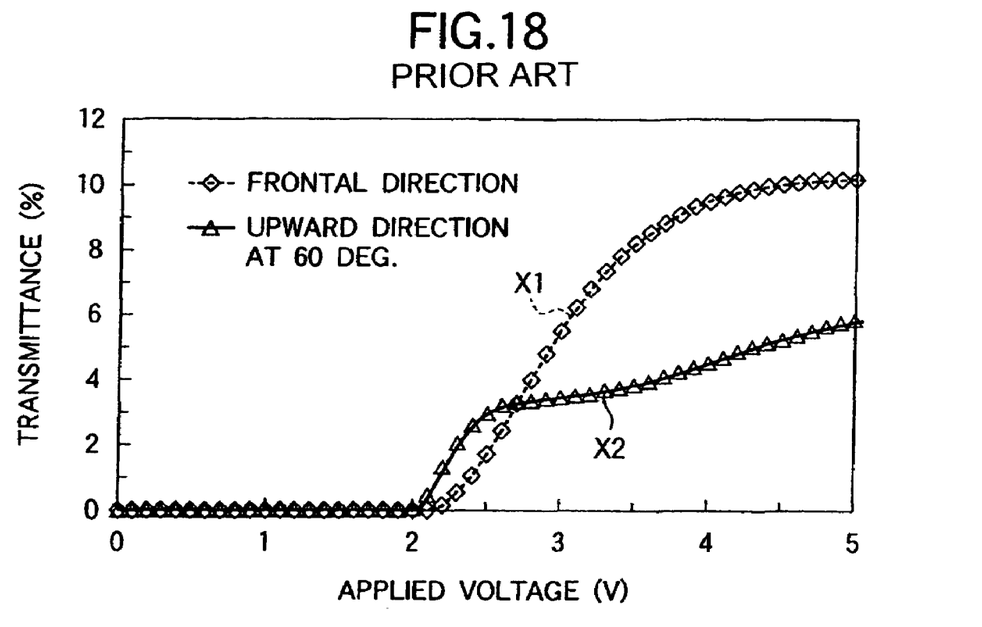
FIG. 18 is a graph showing T-V characteristics of a liquid crystal display according to the related art.

However, MVA-LCDs still have problems to be mitigated. FIG. 18 is a graph showing transmittance characteristics (T-V characteristics) of an MVA-CLD according to the related art. The abscissa axis represents voltages (V) applied to the liquid crystal, and the ordinate axis represents light transmittances (%). The line X1 in the graph indicates T-V characteristics in a direction perpendicular to the display screen (hereinafter referred to as "frontal direction"), and the line X2 indicates T-V characteristics in an upward direction at a polar angle of 60° to the display screen (hereinafter referred to as "diagonal direction"). The polar angle is an angle to a line perpendicular to the display screen. The display mode of the liquid crystal display is the normally black mode. As shown in FIG. 18, the T-V characteristics in the diagonal direction include a region of gradations where the transmittance is higher than that in the T-V characteristics in the frontal direction and a region of gradations where the transmittance is lower than the same. This results in a problem in that chromaticity in the diagonal direction deviates from chromaticity in the frontal direction. In particular, the problem is significant in the region where the transmittance in the diagonal direction is higher than the transmittance in the frontal direction. That is, a problem arises in that a display image in dark halftones has an undesirably whitish appearance in the diagonal direction.

Figure 19:
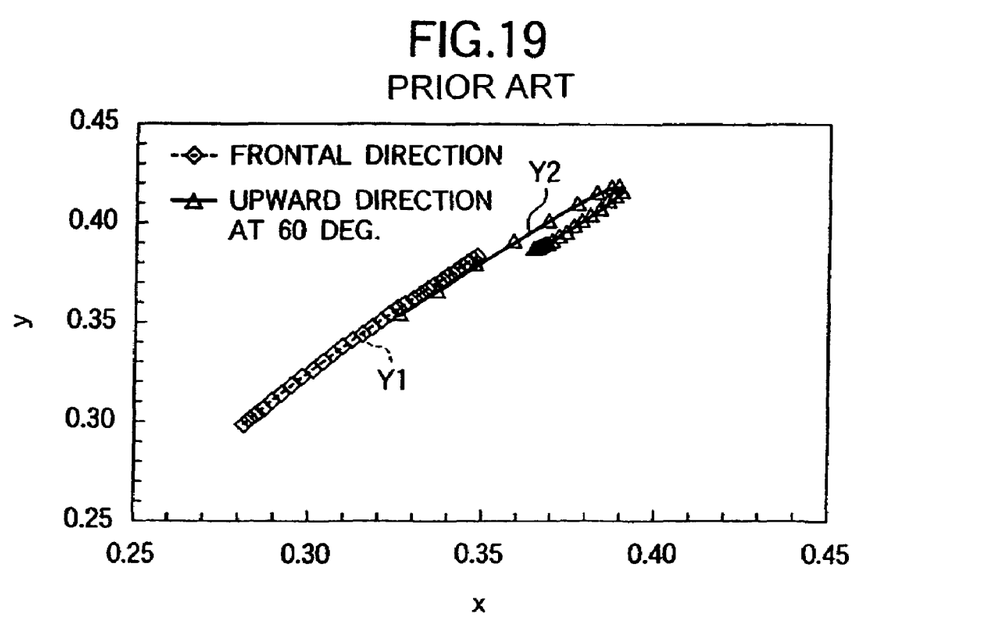
FIG. 19 is a graph showing variation of chromaticity characteristics depending on gradations of the liquid crystal display according to the related art.

FIG. 19 is a graph showing chromaticity characteristics of the MVA-CLD according to the related art. The line Y1 indicates variation of the chromaticity characteristics depending on gradations in the frontal direction, and the line Y2 indicate variation of the chromaticity characteristics depending on gradations in the diagonal direction. As shown in FIG. 19, the MVA-CLD according to the related art has another problem in that its chromaticity varies depending on gradations and viewing angles. The transmittance of each gradation is determined by the magnitude of retardation that occurs in the liquid crystal layer. Chromaticity also varies depending on the magnitude of retardation, and this results in the phenomenon that chromaticity varies depending on gradations.

It is an object of the invention to provide a liquid crystal display having high chromaticity characteristics and viewing angle characteristics.

SUMMARY OF THE INVENTION

The above-described object is achieved by a liquid crystal display characterized in that it has a pair of substrates provided opposite to each other and having electrodes on respective surfaces opposite to each other, a liquid crystal sealed between the pair of substrates, and a pixel region including a low effective voltage area in which an effective voltage applied to the liquid crystal is lower than a voltage applied between the electrodes, the low effective voltage area occupying part of the region in a predetermined area ratio, the pixel region having a threshold voltage that varies between the low effective voltage area and another area.

DESCRIPTION OF THE PREFERRED EMBODIMENTS

[First Mode for Carrying Out the Invention]

Figure 1:
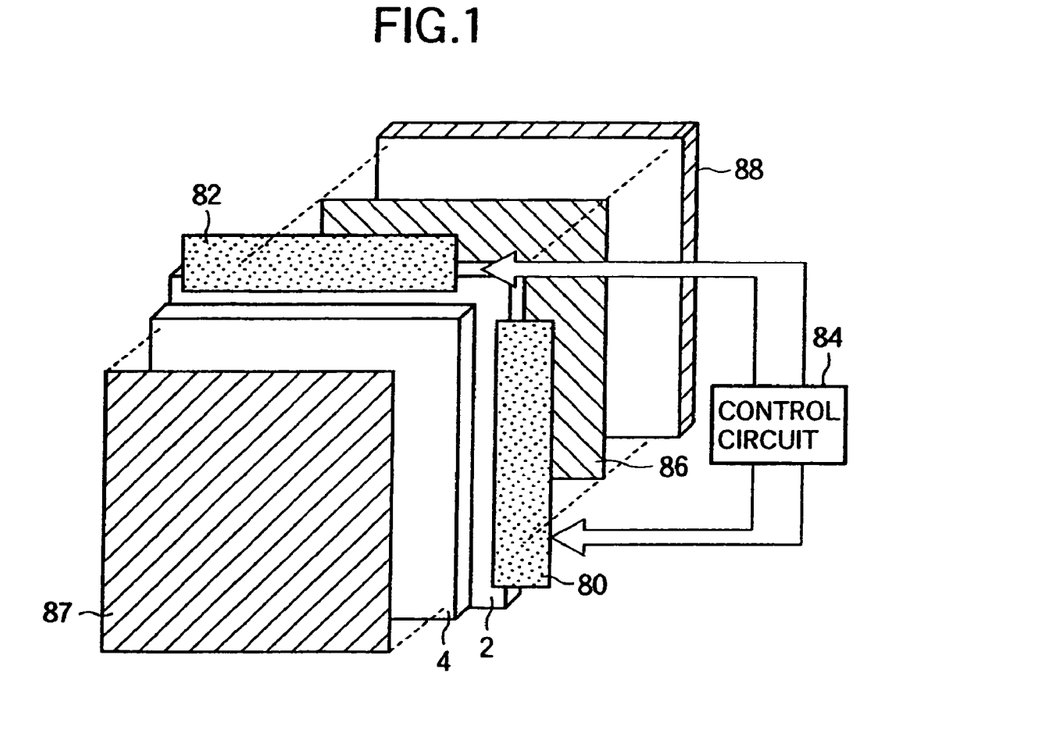
FIG. 1 shows a schematic configuration of a liquid crystal display in a first mode for carrying out the invention.

A liquid crystal display in a first mode for carrying out the invention will now be described with reference to FIGS. 1 to 11. FIG. 1 shows a schematic configuration of the liquid crystal display in the present mode for carrying out the invention. As shown in FIG. 1, the liquid crystal display has a TFT substrate 2 having gate bus lines and drain bus lines formed such that they intersect with each other with an insulation film interposed between them and a TFT and a pixel electrode formed at each pixel. The liquid crystal display also has an opposite substrate 4 having a common electrode formed thereon and a liquid crystal (not shown) sealed between the substrates 2 and 4.

A gate bus line driving circuit 80 loaded with a driver IC for driving the plurality of gate bus lines and a drain bus line driving circuit 82 loaded with a driver IC for driving the plurality of drain bus lines are provided on the TFT substrate 2. The driving circuits 80 and 82 output scan signals and data signals to predetermined gate bus lines and drain bus lines based on predetermined signals output by a control circuit 84. A polarizer 86 is provided on a surface of the TFT substrate 2 opposite to the surface where the elements are formed, and a backlight unit 88 is attached to a surface of the polarizer 86 opposite to the TFT substrate 2. A polarizer 87 in a crossed Nicols relationship with the polarizer 86 is attached to a surface of the opposite substrate 4 opposite to the surface on which the common electrode is formed.

Figure 2:
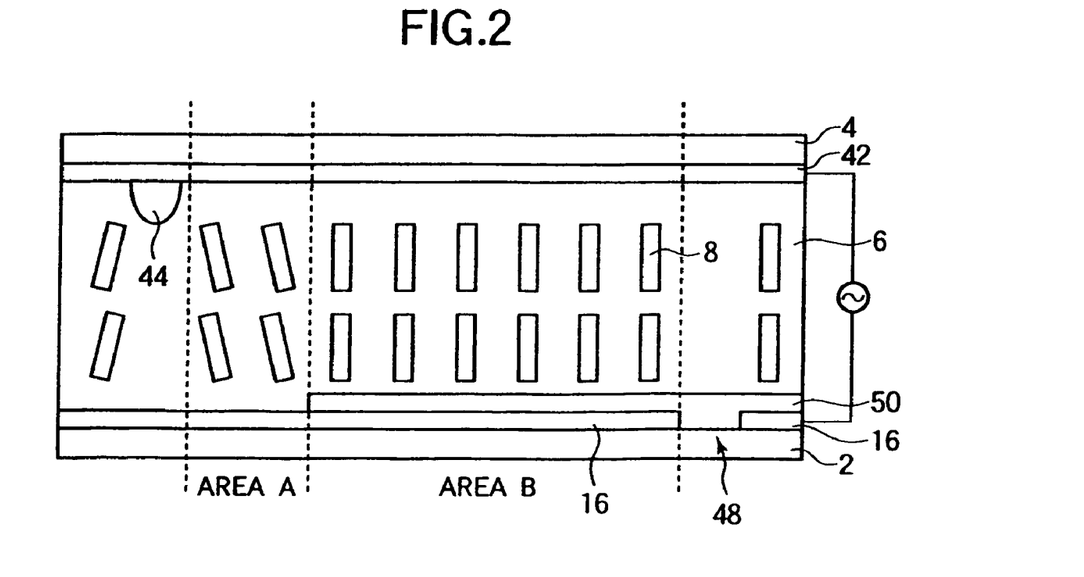
FIG. 2 is a sectional view showing a basic configuration of the liquid crystal display in the first mode for carrying out the invention.
Figure 3:
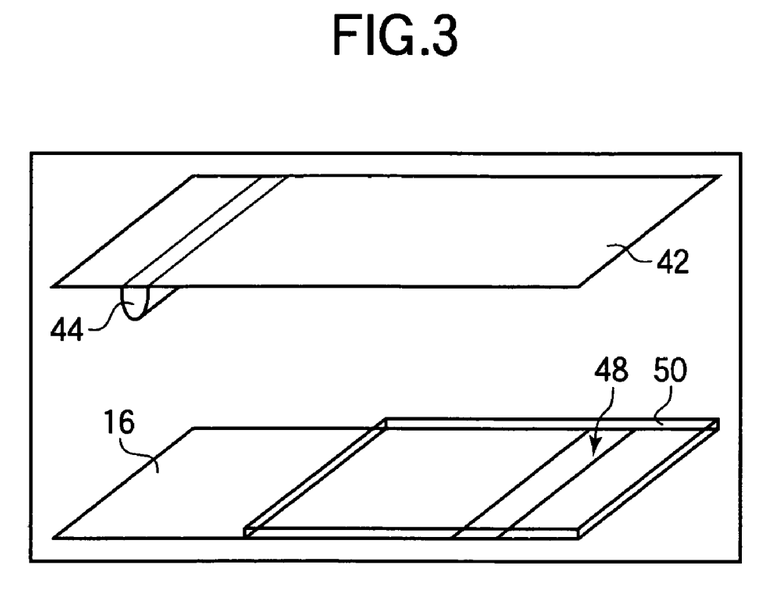
FIG. 3 is a perspective view showing a configuration of the neighborhood of the region shown in FIG. 2.

FIG. 2 is a sectional view showing a basic configuration of the liquid crystal display in the present mode for carrying out the invention. FIG. 3 is a perspective view showing a configuration of the neighborhood of the region shown in FIG. 2. As shown in FIGS. 2 and 3, a liquid crystal 6 is sealed between the TFT substrate 2 and the opposite substrate 4. A pixel electrode 16 is formed at each of pixel regions on the TFT substrate 2. An alignment regulating slit (a blank in the electrode) 48 which is an alignment regulating structure is formed on the pixel electrode 16. A common electrode 42 is formed substantially on the entire surface of the opposite substrate 4. A linear protrusion 44 which is an alignment regulating structure is provided on the common electrode 42. Each pixel region is divided into a plurality of alignment regions by the alignment regulating slits 48 and the linear protrusion 44. In each of the alignment regions, liquid crystal molecules 8 are tilted substantially in the same direction.

A dielectric layer 50 is formed in an area (a low effective voltage area) B that is part of each alignment region on the pixel electrode 16. The dielectric layer 50 is provided to make an effective voltage applied to the liquid crystal 6 in the area B lower than that in another area A in the alignment region. Thus, a threshold voltage in the area B is higher than that in the area A, and two areas A and B having different threshold voltages are formed in the alignment region. Therefore, in a localized observation, each alignment region has two different T-V characteristics. The dielectric layer 50 may be formed on the common electrode 42 because it is only required to be provided between the pixel electrode 16 and the common electrode 42.

Figure 4:
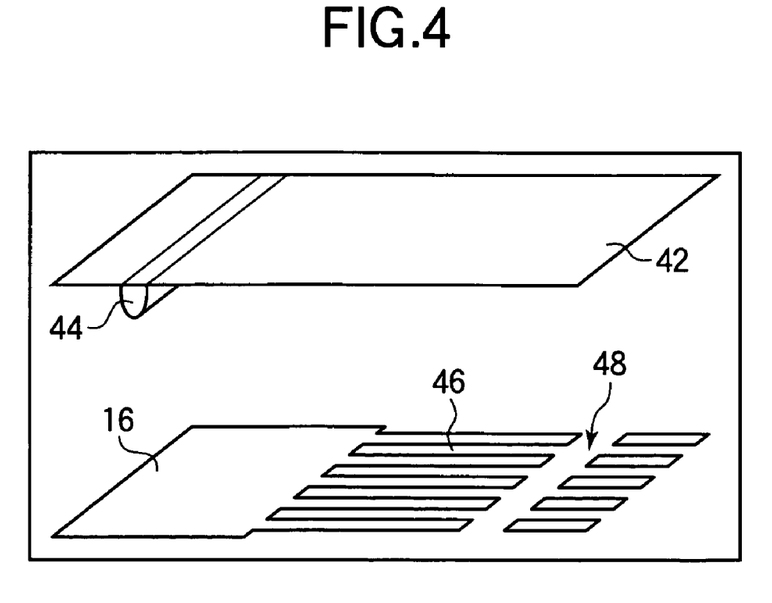
FIG. 4 is a perspective view showing a modification of the basic configuration of the liquid crystal display in the first mode for carrying out the invention.

FIG. 4 is a perspective view showing a modification of the basic configuration of the liquid crystal display in the present mode for carrying out the invention. As shown in FIG. 4, the pixel electrode 16 in the partial area B of the alignment region is formed with effective voltage decreasing slits (electrode blanks) 46 which are blanks in the electrode in the form of stripes. The effective voltage decreasing slits 46 are provided to make the effective voltage applied to the liquid crystal 6 in the area B lower than that in the area A of the alignment region similarly to the dielectric layer 50 shown in FIGS. 2 and 3 rather than being provided as alignment regulating structures.

Figure 5:
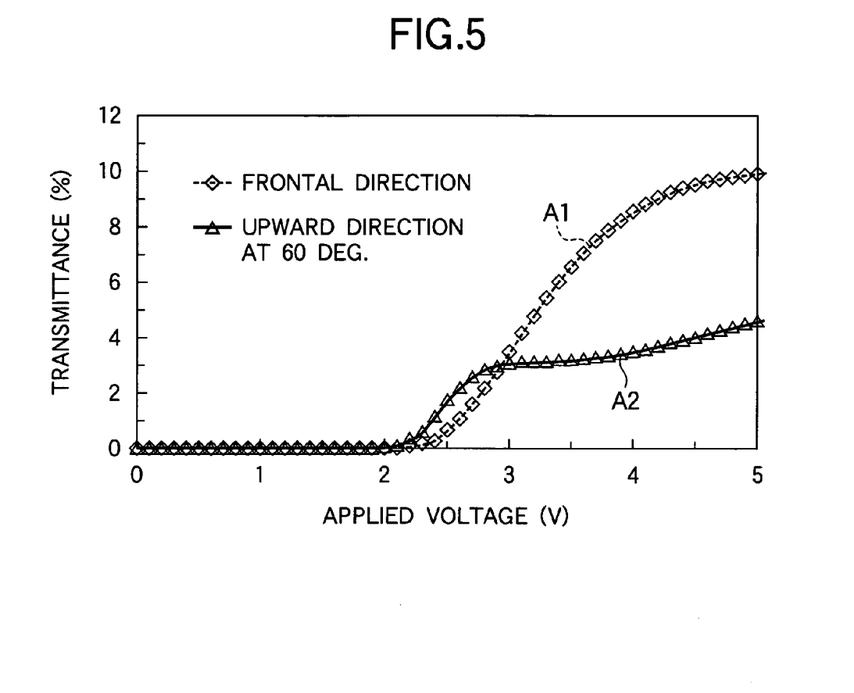
FIG. 5 is a graph showing T-V characteristics of the liquid crystal display in the first mode for carrying out the invention.

FIG. 5 is a graph showing T-V characteristics of the liquid crystal display according to the basic configuration. The abscissa axis represents the voltage (V) applied to the liquid crystal, and the ordinate axis represents light transmittances (%). The line A1 in the graph indicates T-V characteristics in a frontal direction, and the line A2 indicates T-V characteristics in a diagonal direction. As shown in FIG. 5, the T-V characteristics of the liquid crystal display having the basic configuration are averaged between the areas A and B having different threshold voltages, and the difference between transmittances in the frontal and diagonal directions is smaller than that in the T-V characteristics of the liquid crystal display according to the related art shown in FIG. 18. Therefore, the liquid crystal display according to the basic configuration provides high viewing angle characteristics in that there is a small deviation in chromaticity of a display image between the frontal and diagonal directions.

In the liquid crystal display according to the basic configuration, variation of chromaticity depending on gradations and variation of chromaticity depending on viewing angles are significantly mitigated. Providing areas having different threshold voltages in part of a pixel region (alignment region) is to provide areas that are different in retardation in the pixel region. That is, when an arbitrary voltage is applied to the liquid crystal, since liquid crystal molecules are tilted at a different angle in each region, the value of retardation that depends on the tilting angle of liquid crystal molecules is also different in each region. Since differences in retardation between pixels in respective colors are thus moderated at any gradation, there will be smaller variation of chromaticity depending on gradations and viewing angles.

Differences in $\Delta n \cdot d / \lambda$ between pixels in respective colors can be further reduced by adjusting the value of retardation of the pixel in each color depending on the transmission spectrum of the color filter. Specifically, parameters such as the values of retardation in respective regions having different threshold voltages, transmission spectra of color filters, wavelength dispersing properties of the birefringence of the liquid crystal layer, and voltages applied to liquid crystal layer that are different depending on the colors are optimized such that the differences in $\Delta n \cdot d / \lambda$ between the pixels in the colors are minimized in all gradations. This makes it possible to achieve high display characteristics which result in substantially no variation of chromaticity depending on gradations and viewing angles.

Color filters in three colors, i.e., red, green and blue (R, G and B) are used in a common liquid crystal display. Center transmission wavelengths of the cooler filters R, G and B are about 600 nm, about 550 nm and about 450 nm, respectively. Retardation $\Delta n \cdot d$ is about 350 nm. Therefore, there is a difference of about 0.2 between the values $\Delta n \cdot d / \lambda$ of R pixels and B pixels of the liquid crystal display according to the related art. It is therefore possible to achieve high display characteristics which result in substantially no visually perceptible variation of chromaticity depending on gradations and viewing angles by making differences between the values $\Delta n \cdot d/\lambda$ of pixels in the respective colors smaller.

Specifically, what is required is to satisfy relationship expressed as follows:

$$|\Delta n(\lambda i) \cdot di/\lambda i - \Delta n(\lambda j) \cdot dj/\lambda j| < 0.2$$

$$(i, j=1, 2, \ldots, N; i \neq j)$$

where $\lambda k$ ($k=1, 2, \ldots, N; N>2$) represents the center transmission wavelengths of N kinds of color filter layers; $\Delta n(\lambda)$ represents the birefringence of liquid crystal molecules against a wavelength $\lambda$; and dk represents a cell thickness of a pixel having a color filter whose center transmission wavelength is $\lambda k$ between the pixels having at least two kinds among the color filter layers.

It is thus possible to achieve high display characteristics which result in substantially no visually perceptible variation of chromaticity depending on gradations and viewing angles. More preferably, differences between the values $\Delta n \cdot d/\lambda$ of pixels in respective colors are reduced to 0.05 or less. This makes it possible to achieve quite high display characteristics which result in no visually perceptible variation in chromaticity depending on gradations and viewing angles at all.

Figure 6:
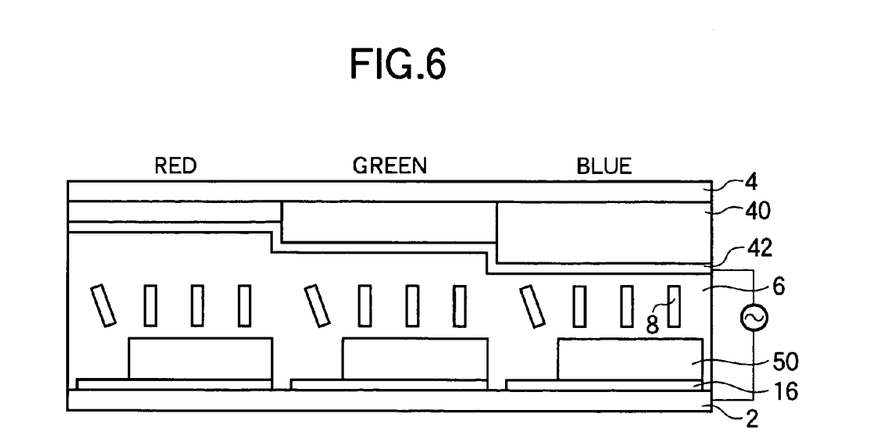
FIG. 6 is a sectional view showing another basic configuration of a liquid crystal display in a first mode for carrying out the invention.

As techniques for reducing differences between the values $\Delta n \cdot d/\lambda$ of pixels in respective colors, there are two methods as described below. FIG. 6 shows a sectional configuration of a liquid crystal display employing the first method. As shown in FIG. 6, color filter layers 40 of pixels in colors R, G and B are provided with different thicknesses to control a cell thickness d of each pixel.

Figure 7:
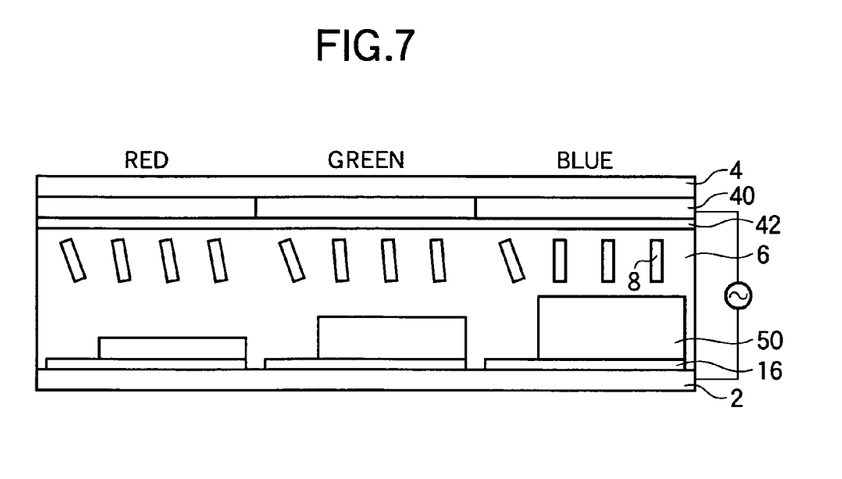
FIG. 7 is a sectional view showing another basic configuration of a liquid crystal display in a first mode for carrying out the invention.
Figure 8:
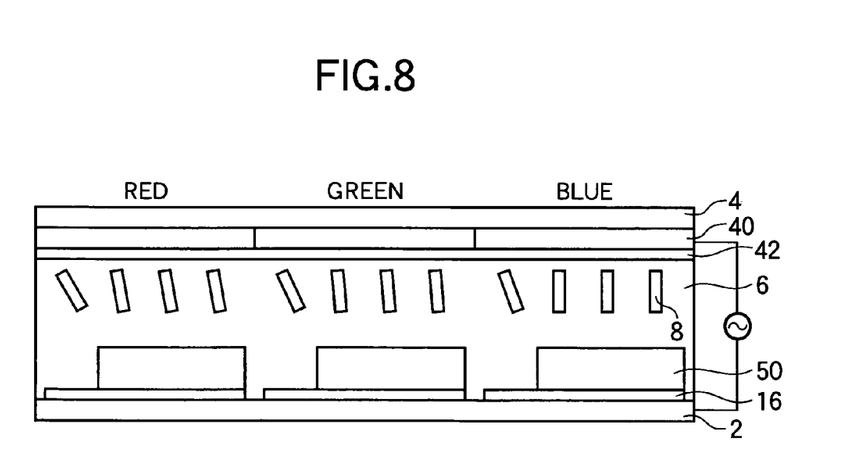
FIG. 8 is a sectional view showing still another basic configuration of a liquid crystal display in a first mode for carrying out the invention.

FIG. 7 shows a sectional configuration of a liquid crystal display employing the second method. As shown in FIG. 7, dielectric layers 50 of the pixels in the respective colors are provided with different thicknesses to apply different effective voltages to the liquid crystal. Alternatively, as shown in FIG. 8, the voltage applied to the liquid crystal layer is varied between the pixels in the respective colors instead of providing the color filter layers 40 or dielectric layers 50 with different thicknesses. In those configurations, the pixels in the respective colors have a substantially constant cell thickness d, and effective retardation $\Delta n(\lambda, \theta)$ of the liquid crystal layer is controlled such that it satisfies the following relationship.

$$|\Delta n(\lambda i, \theta i) \cdot d/\lambda i - \Delta n(\lambda j, \theta j) \cdot d/\lambda j| < 0.2$$

$$(i, j=1, 2, \ldots, N; i \neq j)$$

In the normally black mode, the retardation of the liquid crystal layer must be chosen so as to achieve the maximum transmittance (the maximum contrast in the normally white mode). When differences between the values $\Delta n \cdot d/\lambda$ of the pixels in the respective colors are reduced by controlling the cell thickness d, in order to achieve the maximum transmittance, the retardation $\Delta n(\lambda k) \cdot dk$ of the pixels having the color filters whose center transmission wavelength k is closest to 545 nm (the pixels in green in the case of the RGB configuration) must be set in the range between 250 and 450 nm and, preferably, in the vicinity of 345 nm (250 nm<$\Delta n(\lambda k) \cdot dk$<450 nm). When differences between the values $\Delta n \cdot d/\lambda$ of the pixels in the respective colors are reduced by controlling the effective retardation $\Delta n(\lambda, \theta)$ of the liquid crystal layer in order to achieve the maximum transmittance, the retardation $\Delta n(\lambda k) \cdot dk$ of the pixels having the color filters with the shortest center transmission wavelength $\lambda$ that results in a steepest T-V curve (the pixels in blue in the RGB configuration) must be set in the range between 250 and 450 nm and, preferably, in the vicinity of 345 nm (250 nm<$\Delta n(\lambda k) \cdot d$<450 nm).

When differences between the values $\Delta n \cdot d/k$ of the pixels in the respective colors are reduced by controlling the cell thickness d, variation of chromaticity depending on viewing angles is automatically mitigated by adjusting it so as to eliminate variation of chromaticity depending on gradations. However, when differences between the values $\Delta n \cdot d/\lambda$ of the pixels in the respective colors are reduced by controlling the effective retardation $\Delta n(\lambda, \theta)$ of the liquid crystal layer, a difference between chromaticity (x0, y0) of an incident light source which has been transmitted or reflected by a liquid crystal display panel having no polarizer and chromaticity (x1, y1) of display of white must be smaller than 0.1 ($((x0-x1)^2+(y0-y1)^2)^{1/2}<0.1$). More preferably, the difference in chromaticity is 0.01 or less. When only chromaticity variation depending on gradations in a frontal direction is to be mitigated, since there is no need for reducing the difference between the values $\Delta n \cdot d/\lambda$ of the pixels in the respective colors, adjustment may be made to the chromaticity of any of the pixels. However, in order to mitigate both of chromaticity variation depending on gradations and chromaticity variation depending on viewing angles, differences between the values $\Delta n \cdot d/\lambda$ of the pixels in the respective colors must be reduced because retardation when viewed in a diagonal direction must be matched. For example, in the case of a transmissive liquid crystal display utilizing a backlight, the liquid crystal display can be provided with desired chromaticity by adjusting the chromaticity of light radiated by the backlight.

Figure 9:
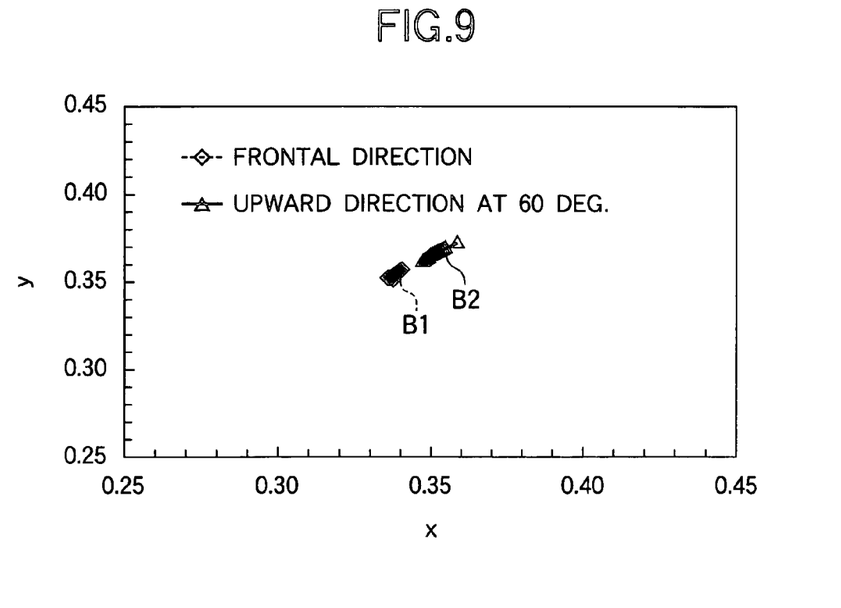
FIG. 9 is a graph showing variation of chromaticity characteristics depending on gradations of a liquid crystal display in the first mode for carrying out the invention.

FIG. 9 is a graph showing chromaticity characteristics of a liquid crystal display for which optimization has been performed for retardation values in regions having different thresholds, color filter transmission spectra and wavelength dispersing properties of the birefringence of the liquid crystal layer. The line B1 indicates variation of the chromaticity characteristics depending on gradations in a frontal direction, and the line B2 indicates variation of the chromaticity characteristics depending on gradations in a diagonal direction. It will be understood that variation in chromaticity depending on gradations has been significantly reduced in both of the frontal and diagonal directions compared to gradation/chromaticity variation characteristics of a liquid crystal display according to the related art shown in FIG. 19. In addition, a difference in chromaticity between the frontal direction and the diagonal direction is reduced to solve problems such as variation of a color depending on viewing angles.

As described above, in the present mode for carrying out the invention, gradation/viewing angle characteristics and gradation/chromaticity variation characteristics are significantly improved, which makes it possible to provide a liquid crystal display having higher display quality. Description will now be made concretely in accordance with Embodiments.

Embodiment 1-1

First, a liquid crystal display according to Embodiment 1-1 in the present mode for carrying out the invention will be described. The liquid crystal display of the present embodiment has a configuration similar to that shown in FIGS. 2 and 3 which has already been described. A dielectric layer 50 for controlling an effective voltage applied to a liquid crystal layer and for increasing a threshold voltage is formed in an area B of, for example, a TFT substrate 2 side of an MVA-LCD having alignment regulating structures such as linear protrusions 44 and alignment regulating slits 48.

An opposite substrate 4 has color filter layers 40 in three colors, i.e., red, green and blue. A common electrode 42 is formed on the color filter layers 40. Linear protrusions 44 having a height of 1.4 µm and a width of 10 µm are formed at intervals of 70 µm on the common electrode 42.

The TFT substrate 2 has a pixel electrode 16 at each of pixel regions. Alignment regulating slits 48 having a width of 10 µm are formed on the pixel electrodes 16 at intervals of 70 µm. A dielectric layer 50 substantially in the form of a rectangle having a width of 50 µm and a height (thickness) of 0.5 µm is formed on each pixel electrode 16, the dielectric layer 50 being located around the alignment regulating slit 48. A columnar spacer is formed on either of the substrates 2 and 4 to obtain a cell thickness of 3.6 µm. A vertical alignment film (manufactured by JSR Corp.) is applied to each of surfaces of the substrates 2 and 4 opposite to each other, and the substrates are combined such that the linear protrusions 44 and the alignment regulating slits 48 are alternately arranged. An n-type liquid crystal (manufactured by Merck Ltd.) having $\Delta n = 0.1$ is filled between the substrates 2 and 4. FIGS. 2 and 3 show only part of four alignment regions that are a result of alignment division in one pixel. In practice, liquid crystal molecules in the alignment regions in one pixel are tilted in respective directions at 45°, 135°, 225°, and 315° (on an assumption that the right side of the display screen is at 0° for example). The areas of the alignment regions in one pixel are substantially equal.

A liquid crystal display formed with no dielectric layer 50 for controlling an effective voltage was fabricated as a comparative example for Embodiment 1-1.

Embodiment 1-2

As Embodiment 1-2, a liquid crystal display was fabricated which had a cell thickness of 4.3 µm chosen to maximize the sum of transmittances in a plurality of regions having different threshold voltages in order to maximize the transmittance of the display.

Embodiment 1-3

As Embodiment 1-3, a liquid crystal display as shown in FIG. 7 was fabricated in which dielectric layers 50 in R, G and B pixels were provided with different thicknesses to mitigate variation of chromaticity depending on gradations. The dielectric layers 50 had thicknesses of 0.3 µm, 0.5 µm, and 0.7 µm in the R, G and B pixels, respectively.

Embodiment 1-4

As Embodiment 1-4, a liquid crystal display as shown in FIG. 6 was fabricated in which the cell thickness was varied in R, G and B pixels to mitigate variation of chromaticity depending on gradations. The cell thickness was 4.7 µm, 4.3 µm, and 3.5 µm in the R, G and B pixels, respectively.

Embodiment 1-5

As Embodiment 1-5, a liquid crystal display as shown in FIG. 8 was fabricated in which a signal conversion board having a gradation conversion table for correcting each of R, G and B was used in a liquid crystal panel similar to that in Embodiment 1-2 to optimize input data voltages between R, G and B pixels.

Although the shape of the dielectric layer 50 is substantially rectangular in Embodiments 1-1 to 1-5, similar effects can be achieved with other shapes. For example, dielectric layers 50 in the form of stripes having a layer width L and a gap width S that satisfy a relationship L/S=0.3 µm/0.3 µm may be provided in a direction orthogonal to the alignment regulating structures, which makes it possible to provide the effect of enhancing alignment controlling power of the alignment regulating structures in addition to the effect of controlling the effective voltage. This allows stronger alignment control to make it possible to improve transmittance and to prevent various display defects.

While the dielectric layers 50 in the R, G and B pixels are provided with different thicknesses to mitigate variation of chromaticity depending on gradations in Embodiment 1-3, similar effects can be achieved by providing dielectric layers 50 having different area ratios and shapes. When dielectric layers 50 in the form of stripes are provided, similar effects can be achieved by optimizing the width and cycle of the dielectric layer 50 between the R, G and B pixels.

Embodiment 1-6

A liquid crystal display according to Embodiment 1-6 in the present mode for carrying out the invention will now be described. The liquid crystal display of the present embodiment has a configuration similar to that shown in FIG. 4 which has already been described. Slits for decreasing an effective voltage (electrode blanks) 46 are formed on a pixel electrode 16 in an area B that is part of an alignment region. The slits 46 for decreasing the effective voltage are provided to decrease the effective voltage applied to a liquid crystal 6 below that in another area A of the alignment region, thereby providing a higher threshold voltage.

An opposite substrate 4 has color filters 40 in three colors, i.e., R, G and B. A common electrode 42 is formed on the color filter layers 40. Linear protrusions 44 having a height of 1.4 µm and a width of 10 µm are formed at intervals of 70 µm on the common electrode 42.

A TFT substrate 2 has a pixel electrode 16 at each of pixel regions. Alignment regulating slits 48 having a width of 10 µm are formed on the pixel electrodes 16 at intervals of 70 µm. The pixel electrode 16 is also provided with slits 46 for decreasing the effective voltage which extend orthogonally to the alignment regulating slit 48 on both sides of the same and which are in the form of stripes narrower than the slit 48 (L/S=3.5 µm/5.0 µm). The configuration is otherwise similar to that in Embodiment 1-1.

In the liquid crystal display of the present embodiment, loss of transmittance can be reduced further by performing optimization such that the sum of transmittances in a plurality of regions having different thresholds just as done in Embodiment 1-2. Higher gradation/chromaticity characteristics can be achieved by optimizing the shape, width, and cycle of the alignment regulating slits 48 between the R, G and B pixels just as done in Embodiment 1-3. Higher gradation/chromaticity characteristics can be achieved by optimizing the cell thickness in each of the R, G and B pixels just as done in Embodiment 1-4. Further, higher gradation/chromaticity characteristics can be achieved by optimizing a data voltage input to the R, G and B pixels just as done in Embodiment 1-5.

Figure 10:
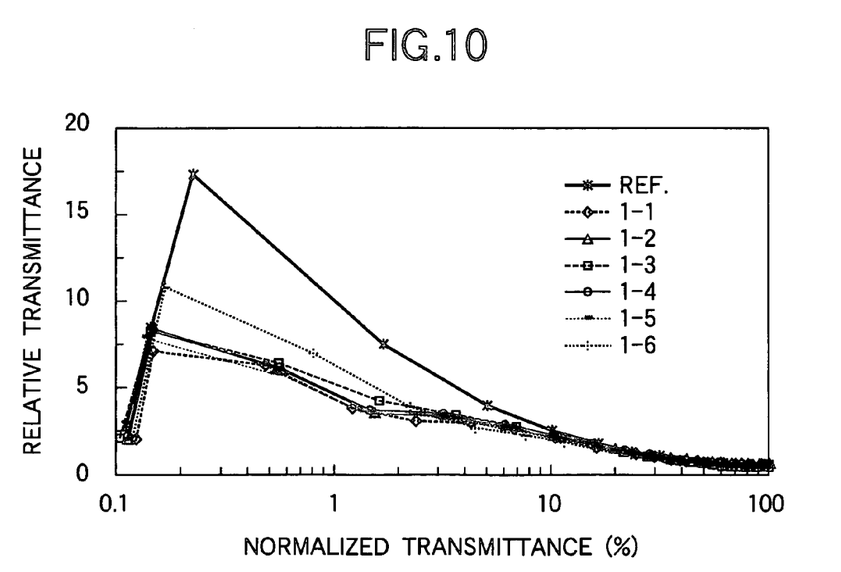
FIG. 10 is a graph collectively showing characteristics of Embodiments 1-1 to 1-6 in the first mode for carrying out the invention and a comparative example (indicated by Ref.)

FIG. 10 is a graph collectively showing the characteristics of Embodiments 1-1 to 1-6 and the comparative example (indicated by Ref.). Normalized transmittances are shown along the abscissa axis in logarithmic representation. The normalized transmittances are shown on an assumption that transmittance is 100% when white is displayed. The ordinate axis represents ratios of transmittance in a diagonal direction to transmittance in a frontal direction (relative transmittances). In the graph shown in FIG. 10, a relative transmittance results in higher gradation/viewing angle characteristics, the more constant the relative transmittance is regardless of the normalized transmittances, i.e., the flatter the profile of the relative transmittance is. A relative transmittance results in higher gradation/viewing angle characteristics, the closer to 1.0 the relative transmittance is. As shown in FIG. 10, Embodiments 1-1 to 1-6 have low relative transmittances and flatter profiles at low transmittances at which relative transmittances have been high in the related art, and the embodiments have relative transmittances closer to 1.0, in general. It is therefore apparent that any of the embodiments achieves a significant improvement in gradation/viewing angle characteristics over the comparative example.

Figure 11:
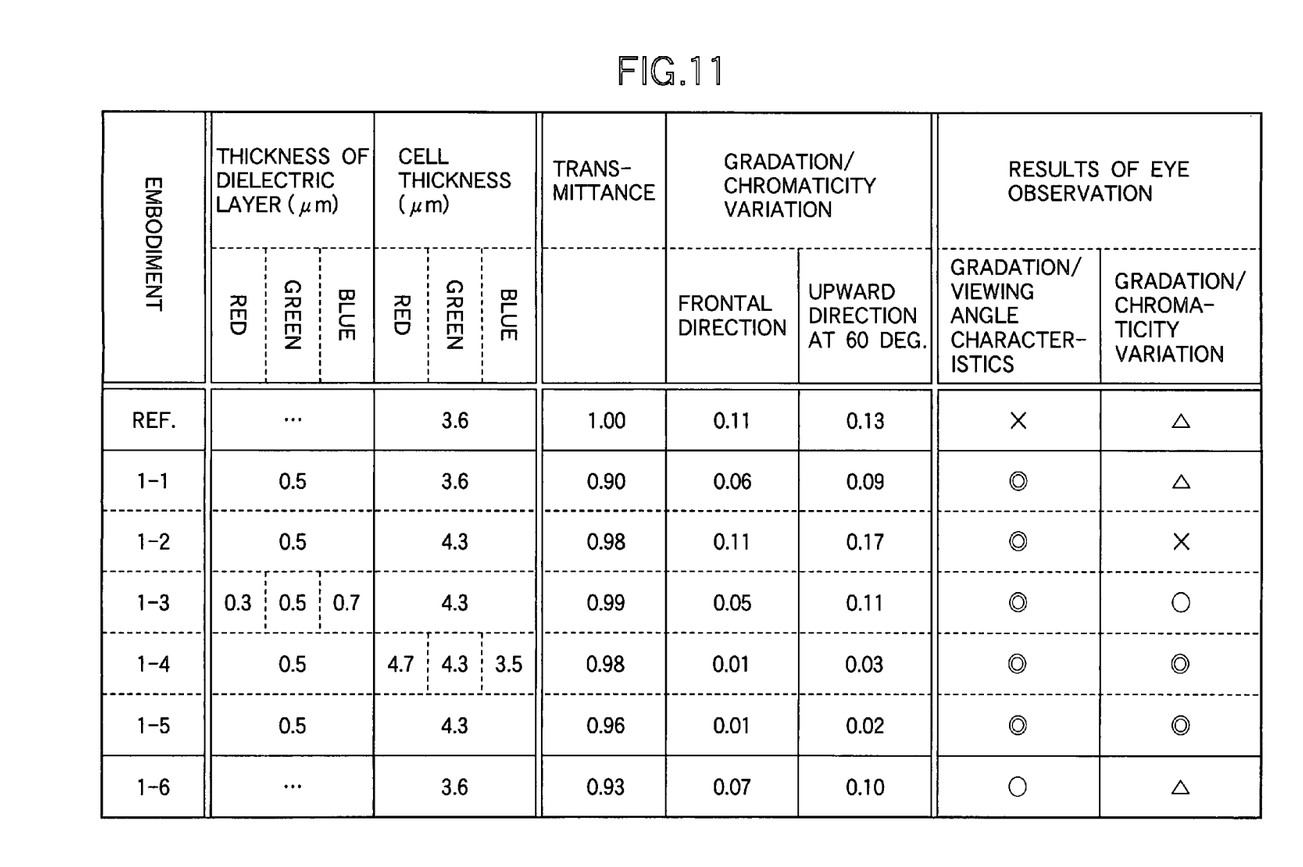
FIG. 11 is a graph collectively showing structures and optical characteristics of Embodiments 1-1 to 1-6 in the first mode for carrying out the invention and the comparative example (indicated by Ref.)

FIG. 11 is a table collectively showing the structures and optical characteristics of Embodiments 1-1 to 1-6 and the comparative example. Transmittances are represented on an assumption that the transmittance of the comparative example is 1.0. Gradation/chromaticity variations represent widths of chromaticity variations that occur during a gradation change from black to white (they correspond to the lengths of respective lines plotted as shown in FIG. 9 or 19). Further, gradation/viewing angle characteristics and gradation/chromaticity variation characteristics obtained by an eye observation of a common image for demonstrative display are shown with evaluation in four classifications represented by symbols ○○, ○, Δ and X which are in the order of excellence. As shown in FIG. 11, all of the embodiments achieve high gradation/viewing angle characteristics and gradation/chromaticity variation characteristics much higher than those of the comparative example with substantially no loss of transmittance and exhibit quite high display performance in general.

In the above-described embodiments, various display defects can be avoided by providing the dielectric layers 50 and the slits 46 for decreasing the effective voltage in regions closer to ends of pixels. Specifically, a display defect which has occurred during display of white in the related art can be prevented by increasing a threshold voltage in a region close to an end of a pixel. In particular, by providing the dielectric layers 50 in regions close to ends of pixels, an effective cell thickness can be made small. Since this improves alignment controlling power, it is possible to provide a liquid crystal display which has less display defects.

In the above-described embodiments, the area ratio of a region where an effective voltage is to be reduced is a parameter indicating which region of gradations is to be primarily improved with respect to gradation/viewing angle characteristics. A difference between threshold voltages is a parameter indicating the degree of a characteristic improvement that can be achieved. Therefore, in order to improve display characteristics of very low gradations that are a problem in MVA-LCDs, the area ratio is preferably in the range from 0.5 to 0.9. More desirably, the area ratio is in the range from 0.6 to 0.8 in which higher display characteristics can be achieved for all gradations. A threshold voltage difference is preferably in the range from 0.1 V to 2.0 V because it is in a trade-off relationship with transmittance. More desirably, a threshold voltage difference is in the range from 0.5 V to 1.0 V in which there is substantially no loss of transmittance and in which higher display characteristics can be achieved for all gradations.

Although the above-described embodiments are examples of the application of the present mode for carrying out the invention to MVA-LCDs, similar effects can be achieved by applying the present mode for carrying out the invention to liquid crystal panels having other switching modes.

Further, although the above-described embodiments are examples of the application of the present mode for carrying out the invention to MVA-LCDs in which alignment division is achieved by the use of linear protrusions 44 and alignment regulating slits 48, similar effects can be achieved by applying the present mode for carrying out the invention to MVA-LCDs having other alignment regulating structures.

Although the dielectric layers 50 and the slits 46 for decreasing an effective voltage are provided in positions around the alignment regulating slits 48, similar effects can be achieved by providing them in other regions. However, since the dielectric layers 50 and the slits 46 for decreasing an effective voltage also have the function of regulating the aligning direction of liquid crystal molecules, it is desirable to provide them such that no inconsistency occurs with the aligning direction of liquid crystal molecules regulated by the alignment regulating structures. Further, the dielectric layers 50 and the slits 46 for decreasing an effective voltage may be formed in an overlapping relationship with alignment regulating structures on a substrate or in an overlapping relationship with alignment regulating structures on another substrate provided in a face-to-face relationship, which improves symmetry of the alignment of the liquid crystal and improves alignment controlling power in general. In practice, it is desirable to design an appropriate layout taking the above-described conditions and a pixel layout into consideration.

Further, in the above-described embodiments, a dielectric layer 50 and slits 46 for decreasing an effective voltage are provided such that they divide one alignment region to provide areas having different threshold voltages in the alignment region. When a plurality of alignment regions exist in one pixel, a dielectric layer 50 and slits 46 for decreasing an effective voltage may be formed to cover at least one of the alignment regions entirely. Effects similar to those described above can be achieved when a dividing ratio and a threshold voltage difference as described above can be achieved on the average throughout the pixel. Further, a threshold voltage difference can be made clear depending on the size and layout of pixels.

Techniques for optimizing an input data voltage as in Embodiment 5-1 include a method in which a scaler circuit is provided for each of the colors R, G and B and a method involving conversion on a software basis such as ICC profiling. Since those methods have similar correcting functions, the most suitable method may be chosen depending on the environment and cost of the liquid crystal display.

As described above, the present mode for carrying out the invention makes it possible to provide an MVA-LCD having high viewing angle characteristics.

[Second Mode for Carrying Out the Invention]

A liquid crystal display in a second mode for carrying out the invention will now be described with reference to FIGS. 12 to 17. Recently, the advent of the MVA mode and IPS mode has resulted in a significant improvement of viewing angle characteristics of liquid crystal displays. However, the viewing angle characteristics have not reached the level of those of CRTs yet. In particular, MVA-LCDs have a problem in that an image displayed in halftones appears somewhat whitish in a diagonal direction.

As a solution to this, a Japanese Patent Application (No. 2002-52303) made by the applicant proposed a technique for curing a photo-curing composition mixed in a liquid crystal such that it has a different pre-tilt angle in part of one pixel. According to this technique, areas having different T-V characteristics such as threshold voltages can be formed in one pixel to improve gradation/viewing angle characteristics.

In a Japanese Patent Application (numbered 2001-98455 which is hereinafter referred to as "Patent Document 1") made by the applicant, a technique as described below is proposed as a technique for imparting a pre-tilt angle. A pre-tilt of liquid crystal molecules can be imparted by adding a monomer or oligomer which is optically or thermally reacted for polymerization in the liquid crystal and polymerizing the monomer or oligomer after the liquid crystal is injected. The pre-tilt angle can be varied by changing a voltage that is applied to the liquid crystal at the time of polymerization. The smaller the pre-tilt angle becomes, the greater the applied voltage. A pre-tilt angle is an angle at which liquid crystal molecules are tilted relative to a substrate surface when no voltage is applied to the liquid crystal layer. That is, "a reduction in a pre-tilt angle" means an increase in an angle of inclination from perfect vertical alignment or approaching to horizontal alignment.

However, the above-described technique is limited in differences between pre-tilt angles that can be formed, and a problem has arisen in that it is difficult to form areas having different T-V characteristics in one pixel. The above-described technique also has a problem in that it makes steps for manufacturing liquid crystal displays complicated.

It is an object of the present mode for carrying out the invention to form areas having different T-V characteristics in one pixel with simple manufacturing steps and to thereby provide a liquid crystal display having high viewing angle characteristics.

Figure 12:
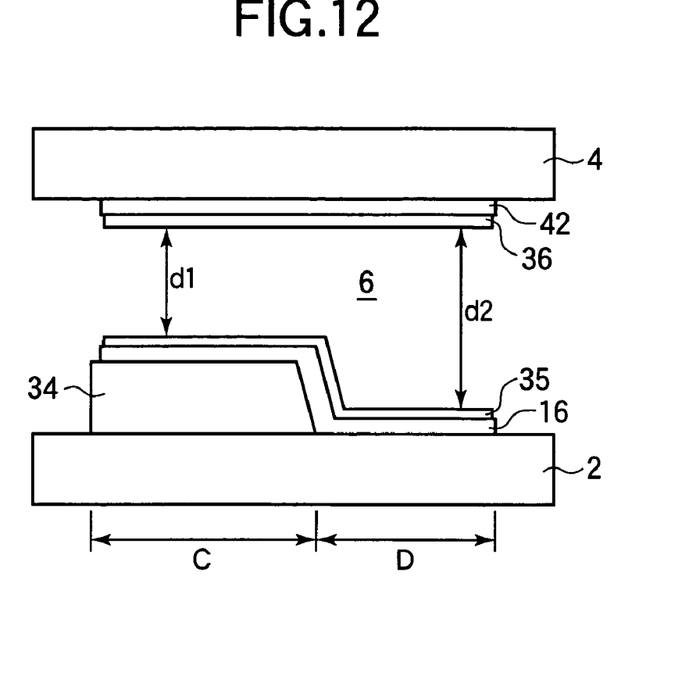
FIG. 12 is a sectional view showing a configuration of a liquid crystal display in a second mode for carrying out the invention.

FIG. 12 schematically shows a sectional configuration of a region substantially corresponding to one pixel of a liquid crystal display in the present mode for carrying out the invention. As shown in FIG. 12, an insulation film 34 having a relatively large thickness is formed in an area C that is a part of a pixel region. Therefore, the area C has a cell thickness d1 that is smaller than a cell thickness d2 of another area D (d1<d2). A polymer is formed in a liquid crystal 6 by polymerizing a polymeric component such as a monomer or oligomer.

Such a distribution of cell thicknesses allows different T-V characteristics to be achieved depending on areas in one pixel after the monomer or oligomer is UV-cured. In the area having the smaller cell thickness d1, the pre-tilt angle of liquid crystal molecules is greater than that in the area D (or closer to vertical alignment), and T-V characteristics are shifted toward a high voltage side. We guess the following. The amount of monomer in the D area is larger than that of C area. This makes the pre-tilt angle of D area smaller than that of C area. It is not essential that the areas C and D are two equal divisions of the pixel, and the areas C and D may be smaller parts of the same which are mingled with each other. Another area having a different cell thickness may be added to the areas C and D.

According to the technique disclosed in Patent Document 1 for controlling a pre-tilt angle using a monomer or oligomer which can be polymerized, variations in T-V characteristics attributable to a variation of the cell thickness are several times greater than those in a case wherein neither monomer nor oligomer is used. In the present mode for carrying out the invention, differences in the T-V characteristics between the areas C and D are therefore clear.

Further, variations of the T-V characteristics become more significant when pre-tilt setting is varied between the areas C and D to set a smaller pre-tilt angle for the area D. The reason is that the T-V characteristics vary depending on the pre-tilt angles even if the cell thicknesses d1 and d2 are equal and that the characteristics of the area having the smaller pre-tilt angle are shifted toward a low voltage.

Methods for varying the pre-tilt angle include a technique in which the voltage applied to the liquid crystal is varied when the monomer or oligomer is polymerized. In this case, a higher voltage results in a smaller pre-tilt angle.

Figure 13:
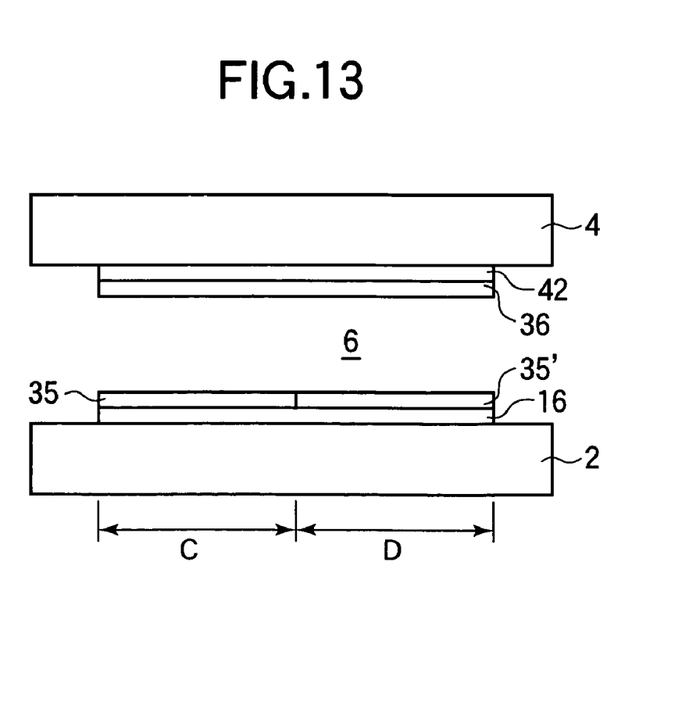
FIG. 13 is a sectional view showing another configuration of a liquid crystal display in the second mode for carrying out the invention.

As a method of varying the pre-tilt angle, a technique may be used in which a monomer and a polymerization initiator are mixed in an alignment film. FIG. 13 schematically shows a sectional configuration of a region substantially corresponding to one pixel of a liquid crystal display in the present mode for carrying out the invention in which the same technique is used. As shown in FIG. 13, a monomer and polymerization initiator are mixed in an alignment film 35' in an area D of the pixel. A monomer and a polymerization initiator are mixed in an alignment film 35 in an area C in a density lower than that in the area D. Alternatively, neither monomer nor polymerization initiator is mixed (in other words, a monomer and polymerization initiator are mixed in a density of 0). Thus, a pre-tilt angle in the area D can be made smaller than that in the area C. Obviously, the monomer and polymerization initiator may be mixed in another alignment film 36. This technique may be used in combination with the method shown in FIG. 12. In this case, the pre-tilt angle in the area D can be made smaller by providing the monomer in the alignment film 35 in the area D in FIG. 12 with a density higher than that in the area C.

Embodiment 2-1

A liquid crystal display panel having a configuration as shown in FIG. 12 was fabricated as a liquid crystal display according to Embodiment 2-1 in the present mode for carrying out the invention. One pixel had a size of about 100×300 µm, and each of areas C and D had a size of about 100×150 µm. An acrylic insulation film PC 403 (manufactured by JSR Corp.) was used as an insulation film 34 which had a thickness of 1.8 µm. The cell thickness was 2.2 µm in the area C and 4.0 µm in the area D. An acrylate monomer was mixed in an amount of 0.5% in a liquid crystal 6 ($\Delta\epsilon=-3.8$; NI-point: 71° C.). After the liquid crystal 6 was injected into a panel, the liquid crystal 6 was irradiated with UV light of about 1 J/cm$^2$ with a voltage of 10 V applied between electrodes 16 and 42. In the present embodiment, display could be preferably performed even when viewed in a diagonal direction compared to an ordinary liquid crystal display panel having a uniform cell thickness (4.0 µm) throughout the same. The monomer to polymerize is not limited to acrylate monomer. For example, metacrylate and so on.

Embodiment 2-2

As a liquid crystal display according to Embodiment 2-2 in the present mode for carrying out the invention, a liquid crystal display was fabricated under the same conditions as those in Embodiment 2-1 except for the voltage applied at the time of polymerization. Although the entire area was irradiated with UV at a time in Embodiment 2-1, monomers in areas C and D were polymerized separately by irradiating them with UV light through a mask. A voltage of 10 V was applied to polymerize the monomer in the area C, and a voltage of 16 V was applied to polymerize the monomer in the area D. The present embodiment could perform display more preferably than the liquid crystal display panel of Embodiment 2-1 did when viewed in a diagonal direction.

Embodiment 2-3

A liquid crystal display panel having a configuration as shown in FIG. 13 was fabricated as a liquid crystal display according to Embodiment 2-3 in the present mode for carrying out the invention. One pixel had a size of about 100×300 µm, and each of areas C and D had a size of about 100×150

μm. The cell thickness was 4.0 μm. An acrylate monomer and a polymerization initiator (Irgacure 651 manufactured by Ciba Specialty Chemicals Holding Inc.), each in an amount of 5% by weight of a material to be aligned including a solvent, were mixed in an alignment film 35' during printing. Neither monomer nor polymerization initiator was mixed in alignment films 35 and 36. An acrylate monomer was mixed in an amount of 0.5% in a liquid crystal 6 ($\Delta\epsilon=-3.8$; NI-point: 71° C.) just as in Embodiment 2-1. After the liquid crystal 6 was injected into a panel, the liquid crystal 6 was irradiated with UV light of about 1 $J/cm^2$ with a voltage of 10 V applied between electrodes 16 and 42. In the present embodiment, display could be preferably performed even when viewed in a diagonal direction compared to an ordinary liquid crystal display panel.

Embodiment 2-4

Figure 14:
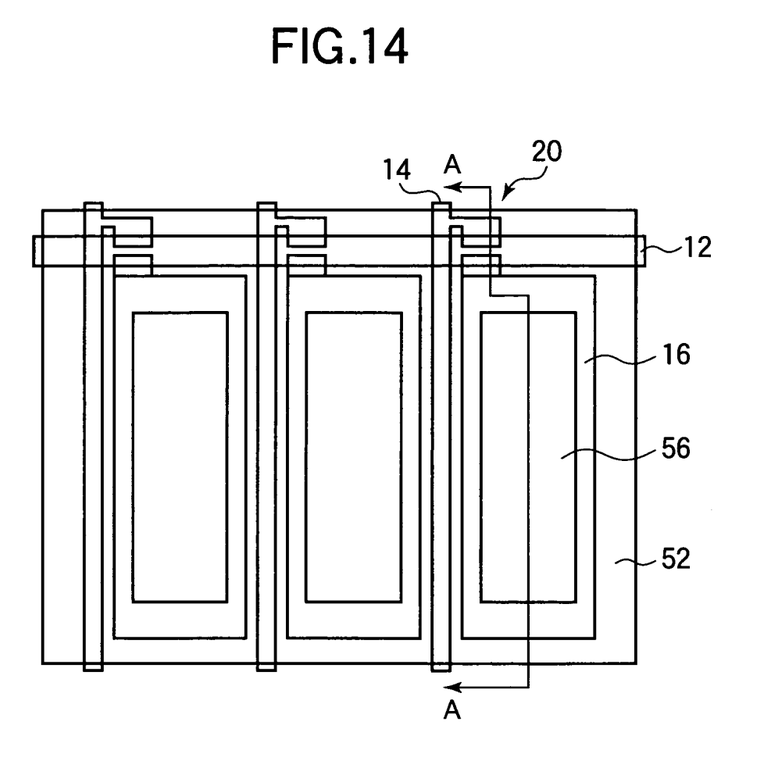
FIG. 14 shows a configuration of a liquid crystal display according to Embodiment 2-4 in the second mode for carrying out the invention.
Figure 15:
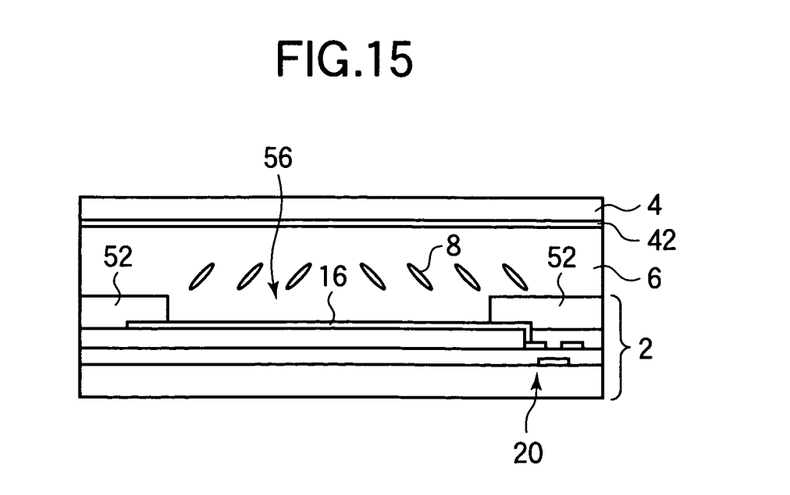
FIG. 15 is a sectional view showing the configuration of the liquid crystal display according to Embodiment 2-4 in the second mode for carrying out the invention.

A liquid crystal display panel having a configuration as shown in FIGS. 14 and 15 was fabricated as a liquid crystal display according to Embodiment 2-4 in the present mode for carrying out the invention. FIG. 14 shows a configuration of a region substantially corresponding to three pixels of the liquid crystal display panel of the present embodiment, and FIG. 15 shows a schematic sectional configuration of the liquid crystal display panel taken along the line A-A in FIG. 14. As shown in FIGS. 14 and 15, in the present embodiment, a dielectric layer 52 is formed at the periphery of each of pixel regions defined by gate bus lines 12 and drain bus lines 14, the dielectric layer being formed on a pixel electrode 16. An acrylic insulation film PC 403 (manufactured by JSR Corp.) was used as the dielectric layer 52. The dielectric layer 52 is a transparent body which exhibits a transmittance of 90% or more in the region of visible light. An opening 56 is formed in the middle of a pixel by providing a hole in the dielectric layer 52. The pixel electrode 16 is exposed at the opening 56. A TFT 20 is formed in the vicinity of each of intersections between the gate bus lines 12 and the drain bus lines 14. One pixel has a size of about 100×300 μm. The cell thickness was 4.0 μm in the middle of a pixel. An acrylate monomer was mixed in an amount of 0.5% in a liquid crystal 6 ($\Delta\epsilon=-3.8$; NI-point: 71° C.). After the liquid crystal 6 was injected into a panel, the liquid crystal 6 was irradiated with UV light of about 1 $J/cm^2$ with a voltage of 10 V applied between electrodes 16 and 42.

Figure 16:
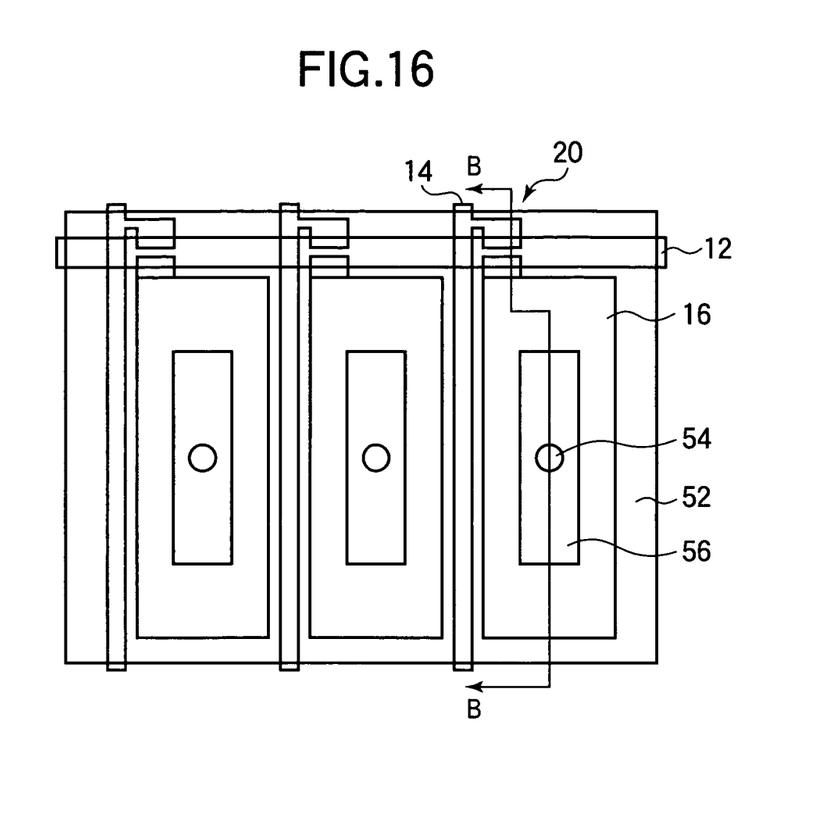
FIG. 16 shows another configuration of a liquid crystal display according to Embodiment 2-4 in the second mode for carrying out the invention.
Figure 17:
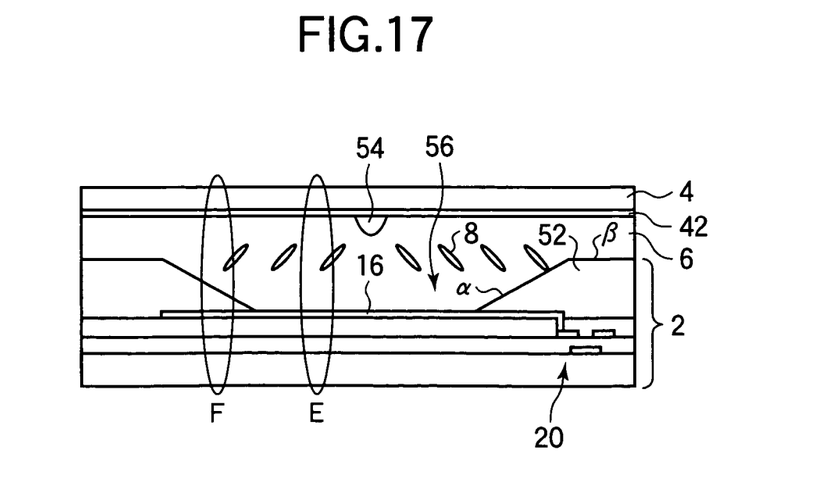
FIG. 17 is a sectional view showing the other configuration of a liquid crystal display according to Embodiment 2-4 in the second mode for carrying out the invention.

A liquid crystal display panel having a configuration as shown in FIGS. 16 and 17 was fabricated as a modification of the liquid crystal display according to present embodiment. FIG. 16 shows a configuration of a region substantially corresponding to three pixels of the liquid crystal display panel of the present modification, and FIG. 17 shows a schematic sectional configuration of the liquid crystal display panel taken along the line B-B in FIG. 16. As shown in FIGS. 16 and 17, in the present modification, end faces of the dielectric layer 52 formed at the periphery of each pixel are inclined toward the opening 56. The thickness of the dielectric layer 52 is preferably equal to or greater than 0.1 μm and equal to or smaller than one-half of the cell thickness. The thickness of the dielectric layer 52 may be equal to the cell thickness if a boundary between an inclined surface a and a flat surface β of the dielectric layer 52 is located outside the pixel region. On a common electrode 42 on an opposite substrate 4, a point-like protrusion 54 is formed substantially in the middle of each pixel. The conditions are otherwise the same as those in the above-described embodiment.

By providing the dielectric layers 52 at the periphery of the pixels as thus described, liquid crystal molecules 8 can be aligned toward the centers of the pixel regions when a voltage is applied to the liquid crystal layer. However, when a high voltage is abruptly applied, a great number of disclination lines are generated at random. Therefore, when the monomer is polymerized by performing irradiation with UV light while applying a voltage, it is desirable to perform UV irradiation while generating regular disclination lines by gradually increasing the applied voltage from a low voltage.

By uniformly applying a voltage of 10 V between electrodes 16 and 42 throughout a pixel, a voltage that is substantially 10 V is applied to an area E of the liquid crystal 6 shown in FIG. 17, and a voltage that is substantially about 6 V is applied to an area F because there is a voltage distribution of the dielectric layer 52. By performing UV irradiation in this state, a difference can be created in that the pre-tilt angle in the area F is slightly smaller than 90° and the pre-tilt angle in the area E is smaller than that in the area F. Thus, the areas E and F can be provided with different electro-optical characteristics based on the difference in the substantial voltage at the time of driving and the difference in the pre-tilt angle attributable to the presence or absence of the dielectric layer 52. In the present embodiment and the modification of the same, preferable display could be performed even when viewed in a diagonal direction in comparison to an ordinary liquid crystal display panel having a uniform cell thickness (4.0 μm) throughout the same.

While one opening 56 and one protrusion 54 are formed at each pixel in the configuration shown in FIGS. 16 and 17, a plurality of openings 56 and protrusions 54 may be formed at each pixel.

As described above, the present mode for carrying out the invention makes it possible to form areas having different T-V characteristics in one pixel with simple manufacturing steps and to thereby provide a liquid crystal display having high viewing angle characteristics.

As described above, the invention makes it possible to provide a liquid crystal display having high chromaticity characteristics and viewing angle characteristics.

What is claimed is:
1. A liquid crystal display comprising:
a pair of substrates provided opposite to each other with one of said substrates having a pixel electrode and the other of said substrates having a common electrode;
a liquid crystal sealed between the pair of substrates; and
a pixel region including at least one low effective voltage area in which an effective voltage applied by the pixel and the common electrodes to the liquid crystal is lower than a voltage applied between the pixel and the common electrodes at another area, the at least one low effective voltage area occupying part of the region in a predetermined area ratio, the pixel region having a threshold voltage that is different between the at least one low effective voltage area and said another area, and
the pixel region also including a color filter layer having one color formed on at least one of the pair of substrates, wherein the effective voltage in the pixel region is different from that in another pixel region including a color filter layer having another color, wherein at least one of the color filters is blue, and further wherein the effective voltage in the low effective voltage areas associated with the blue color filter is lower than the effective voltage in the low effective voltage areas associated with color filters of colors other than blue,
wherein the low effective voltage area has an effective voltage decreasing slit, formed on at least one of the electrodes,
wherein the liquid crystal is a nematic liquid crystal having negative dielectric constant anisotropy whose initial alignment is vertical to a surface of the substrates when no voltage is applied between the pixel and common electrodes, wherein:

the plurality of color filter layers have center transmission wavelengths λk (k=1, 2, ..., N; N>2);

a cell thickness d of the pixel region is substantially constant regardless of the center transmission wavelengths λk;

effective retardation Δn(λk, θk) of the liquid crystal layer at the time of application of a data voltage Vk that imparts a tilt angle θk to liquid crystal molecules satisfies a relationship expressed by:

$|\Delta n(\lambda i, \theta i)\cdot d/\lambda i - \Delta n(\lambda j, \theta j)\cdot d/\lambda j|<0.2$ (i, j=1, 2, ..., N; i≠j)

between pixel regions each having two kinds among the color filter layers; and chromaticity (x0, y0) of an incident light source which has been transmitted or reflected by the liquid crystal display panel and chromaticity (x1, y1) of display of white satisfy a relationship expressed by:

$((x0-x1)^2+(y0-y1)^2)^{1/2}<0.1$ when no polarizer is provided.

2. A liquid crystal display according to claim 1, wherein:
the threshold voltage of the low effective voltage area is higher than the threshold voltage of the other area by a predetermined voltage difference; and
the voltage difference is in the range from 0.1 V to 2.0 V.

3. A liquid crystal display according to claim 1, wherein the area ratio varies depending on the center transmission wavelength λ of a color filter layer that the pixel region has.

4. A liquid crystal display according to claim 1, wherein the low effective voltage area has a dielectric layer formed with a predetermined thickness on at least one of the electrodes.

5. A liquid crystal display according to claim 4, wherein the dielectric layer is formed like stripes having a predetermined layer width and gap width.

6. A liquid crystal display according to claim 1, wherein the effective voltage decreasing slit is formed like stripes having a predetermined electrode width and gap width.

7. A liquid crystal display according to claim 1, wherein the low effective voltage area is provided in the vicinity of an end of the pixel region.

8. A liquid crystal display according to claim 1, further comprising an alignment regulating structure for regulating the alignment of the liquid crystal provided on at least one of the substrates, wherein the pixel region has a plurality of alignment regions in which the liquid crystal is aligned in different directions.

9. A liquid crystal display comprising:
a pair of substrates provided opposite to each other with one of said substrates having a pixel electrode and the other of said substrates having a common electrode;
a liquid crystal sealed between the pair of substrates; and
a pixel region including at least one low effective voltage area in which an effective voltage applied by the pixel and the common electrodes to the liquid crystal is lower than a voltage applied between the pixel and the common electrodes at another area, the at least one low effective voltage area occupying part of the region in a predetermined area ratio, the pixel region having a threshold voltage that is different between the at least one low effective voltage area and said another area;

wherein the area ratio of the low effective voltage area to total area of each pixel region is in the range from 0.6 to 0.8, wherein:

color filter layers of blue and at least one other color formed on at least one of the substrates, wherein color filter layers have center transmission wavelengths λk (k=1, 2, ..., N; N>2);

a cell thickness d of the pixel region is substantially constant regardless of the center transmission wavelengths λk;

effective retardation Δn(λk, θk) of the liquid crystal layer at the time of application of a data voltage Vk that imparts a tilt angle θk to liquid crystal molecules satisfies a relationship expressed by:

$|\Delta n(\lambda i, \theta i)\cdot d/\lambda i - \Delta n(\lambda j, \theta j)\cdot d/\lambda j|<0.2$ (i, j=1, 2, ..., N; i≠j)

between pixel regions each having two kinds among the color filter layers; and chromaticity (x0, y0) of an incident light source which has been transmitted or reflected by the liquid crystal display panel and chromaticity (x1, y1) of display of white satisfy a relationship expressed by:

$((x0-x1)^2+(y0-y1)^2)^{1/2}<0.1$ when no polarizer is provided.

10. A liquid crystal display according to claim 9, wherein:
the threshold voltage of the low effective voltage area is higher than the threshold voltage of the other area by a predetermined voltage difference; and
the voltage difference is in the range from 0.1 V to 2.0 V.

11. A liquid crystal display according to claim 9,
wherein the area ratio varies depending on a center transmission wavelength λ of a color filter layer that the pixel region has.

12. A liquid crystal display according to claim 9, wherein the low effective voltage area has a dielectric layer formed with a predetermined thickness on at least one of the electrodes.

13. A liquid crystal display according to claim 12, wherein the dielectric layer is formed like stripes having a predetermined layer width and gap width.

14. A liquid crystal display according to claim 9, wherein the low effective voltage area has an effective voltage decreasing slit, formed on at least one of the electrodes.

15. A liquid crystal display according to claim 14, wherein the effective voltage decreasing slit is formed like stripes having a predetermined electrode width and gap width.

16. A liquid crystal display according to claim 9,
wherein the low effective voltage area is provided in the vicinity of an end of the pixel region.

17. liquid crystal display according to claim 9, wherein the liquid crystal is a nematic liquid crystal having negative dielectric constant anisotropy whose initial alignment is vertical to a surface of the substrates when no voltage is applied between the pixel and common electrodes.

18. A liquid crystal display according to claim 17, further comprising an alignment regulating structure for regulating the alignment of the liquid crystal provided on at least one of the substrates, wherein the pixel region has a plurality of alignment regions in which the liquid crystal is aligned in different directions.

* * * * *

UNITED STATES PATENT AND TRADEMARK OFFICE
CERTIFICATE OF CORRECTION

| | | |
|---|---|---|
| PATENT NO. | : 7,515,214 B2 | Page 1 of 1 |
| APPLICATION NO. | : 10/808218 | |
| DATED | : April 7, 2009 | |
| INVENTOR(S) | : Ueda et al. | |

It is certified that error appears in the above-identified patent and that said Letters Patent is hereby corrected as shown below:

<u>In the Claims</u>:

Col. 16, line 53 Claim 16, delete "Liquid" and insert --A liquid--.

Signed and Sealed this

First Day of September, 2009

David J. Kappos
*Director of the United States Patent and Trademark Office*